United States Patent [19]

Euerle

[11] 4,273,155
[45] Jun. 16, 1981

[54] BACK-PRESSURE VALVE FOR HEATING INSTALLATIONS

[76] Inventor: Karl Euerle, Bruckstrasse 73, D-7463 Rosenfeld 1, Fed. Rep. of Germany

[21] Appl. No.: 36,904

[22] Filed: May 7, 1979

[30] Foreign Application Priority Data

May 9, 1978 [DE] Fed. Rep. of Germany ... 7813921[U]

[51] Int. Cl.³ .............................................. F16K 15/02
[52] U.S. Cl. ............................. 137/543.17; 137/515.7; 137/512.1
[58] Field of Search ...................... 137/543.15, 543.17, 137/543.19, 543.21, 515.7, 512.1, 512.2; 251/212

[56] References Cited

U.S. PATENT DOCUMENTS

| | | | |
|---|---|---|---|
| 968,916 | 8/1910 | Benner | 137/543.15 X |
| 3,700,001 | 10/1972 | Rudel | 137/515.7 X |
| 3,878,861 | 4/1975 | Pareja | 137/543.17 |

*Primary Examiner*—William R. Cline
*Attorney, Agent, or Firm*—George R. Douglas, Jr.

[57] ABSTRACT

An improved back-pressure valve for heating installations having an annular mask mounted transverse of a channel in a pipe or pump, a sealing disc for covering an opening formed by an annular mask, a spring urging it closed, and the sealing disc mounted to be pivotally and linearly movable in response to resulting consequences of vortices in fluid flow passing through the pipe or pump. The sealing disc may have two diametrically opposed protuberances extending into a guide and urged by a spring abating on the protuberances. Also a sealing disc may comprise two superposed sealing discs guided by a stud so that the sealing discs have a relative rotational motion between themselves.

1 Claim, 6 Drawing Figures

BACK-PRESSURE VALVE FOR HEATING INSTALLATIONS

CROSS-REFERENCE TO PRIOR ART DISCLOSURES AND REFERENCES

No known anticipatory prior art or references are known to contemplate the object and advantages and construction of the present invention.

BRIEF SUMMARY OF THE INVENTION

The invention concerns and relates to an improved back-pressure valve, specifically for heating installations, with an annular mask having a through-flow opening and being mountable between two coaxially joining pipe sections, and having a sealing disc and a spring acting mechanism in the closing direction. Back-pressure valves of this kind are called disc back-pressure valves in a double sense because on one hand the sealing component is disc-shaped and on the other hand the valve assembly is conceived as a supporting disc, i.e. a proper housing and the corresponding connection means are missing. The valve is preferably fitted directly into the pipe system, e.g. in a screw joint, especially of a circulation pump, or between two flanges.

BACKGROUND OF THE INVENTION

Known back-pressure valves may have a diametrical bridge in the circular opening of the mask. An axial stud affixed in the center guides the sealing disc having in its center an appropriate bore. A conical spring abuts with its large end against the sealing disc and with the small end against a head of the stud. Although there is provided a clearance between the stud and the bore, it is seen that the sealing disc can move essentially only in an axial direction. The flow resistance and hence the loss of pressure with an open back-pressure valve is relatively important in the pipe system concerned.

SUMMARY OF THE INVENTION

The invention proposes a disc back-pressure valve having a lower flow resistance when open.

Starting from a back-pressure valve of the kind initially described the problem is solved, according to preferred embodiments of the invention, by arranging the sealing disc pivotable and movable in a straight line on the mask and by a device combining the pivoting motion with the straight line motion. The combined pivoting and straight line motion automatically increases the through-flow section of the open valve being greater than with other known disc back-pressure valves.

In a preferred form of an embodiment of the invention the sealing disc has two protuberances being diametrically opposed and protruding into a guide parallel to the axis arranged on the mask, a coil spring, having a greater diameter than the sealing disc pushing against the protuberances. In this arrangement the sealing disc acts as a flap pivoting around a central transversal axis being movable lengthwise. This flap may first be lifted axially, as do known sealing discs. Due to the unstable arrangement of the axis and as a consequence of the vortices of the flow immediately has a tendency to pivot, which increases the through-flow section.

To support and improve the pivoting motion it is proposed to arrange a weight on the sealing disc or on one asymmetrical side of the connecting line of the protuberances. Alternatively the surface areas of the partial sections of the sealing disc on both sides of the connecting line of the protrusions may be different.

An important diminition of the flow resistance, compared to known back-pressure valves results with this concept from the absence of a bridge in the through-flow opening. The guides for the protuberances, being simultaneously abutments for the spring are arranged on the edge of the through-flow opening of the mask. It must be pointed out that a good exploitation of the available pipe section is extremely important with disc back-pressure valves since with this type of valve no diameter increase over the pipe diameter is possible.

Another form of a preferred embodiment using the basic idea of the invention can be realized by combining the flap function with the sliding function. In this regard it is proposed to arrange two superposed sealing discs on a stud secured to the mask in such a manner that when moving longitudinally the discs have a relative rotation between themselves and that both sealing discs have openings covering each other when the valve is closed and uncovering when opening the valve.

BRIEF DESCRIPTION OF THE SEVERAL VIEWS OF THE DRAWING

The above and other objects and advantages of the invention will become apparent upon full consideration of the following detailed description and accompanying drawings in which.

DETAILED DESCRIPTION OF THE PREFERRED EMBODIMENT

Figure 1:
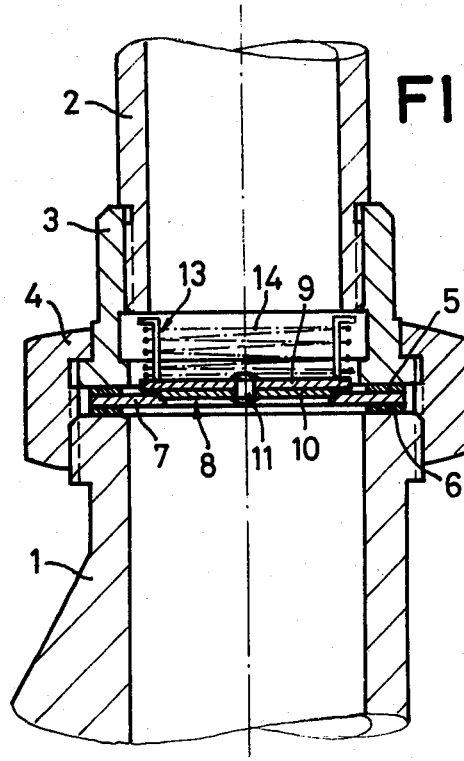
FIG. 1 is a cross-sectional view of a back-pressure valve being closed taken along line 1—1 of FIG. 3.
Figure 2:
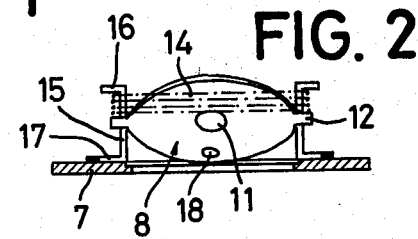
FIG. 2 is also a cross-sectional view similar to FIG. 1 of the back-pressure valve being open.
Figure 3:
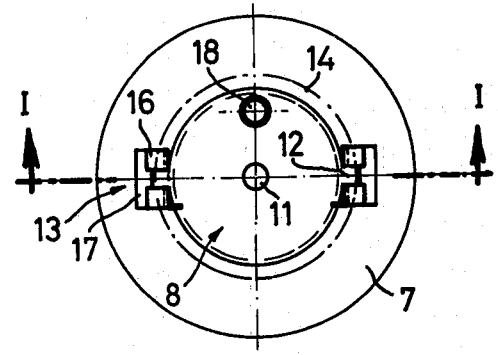
FIG. 3 is a plan view of the back-pressure valve according to FIG. 1.

Referring now to the drawings there is shown in FIG. 1 a disc back-pressure valve mounted in a screw joint of a circulation pump 1. A pipe 2 is screwed into a threaded flange 3 being screwed to the circulation pump 1 with a coupling nut 4. An annular mask 7 is fitted between two seals 5 and 6 laying between the threaded flange and the pump outlet. The mask has a circular opening being covered by a sealing disc 8. The sealing disc is composed of an upper cover disc 9 and a lower seal disc 10 being held together by a rivet 11 in the center. The seal disc 10 is a circular disc of an appropriate material while the cover disc 9 is metallic and has two diametrically opposed protuberances 12. Said protuberances slide into two diametrically arranged guides 13 affixed to the mask 7 and are urged or held down by a coil spring 14. The guides 13 are U-shaped sheet metal parts consisting of a web 15 and two flanges 16 and 17 extending radially outwardly, the flange 17 being a little longer and affixed to the mask by spot-welding. The guides 13 have a longitudinal slot cutting into two separate parts the web 15 and the upper flange 16, the lower flange 17 only being in one part. The protuberances 12 can pivot and move up and down in the slots of the web 15. The coil spring is abutting on one side on the protuberances 12 and on the other side on the upper flanges 16. A small weight 18 is off-centrically secured to one-half of the sealing disc 8.

Figure 4:
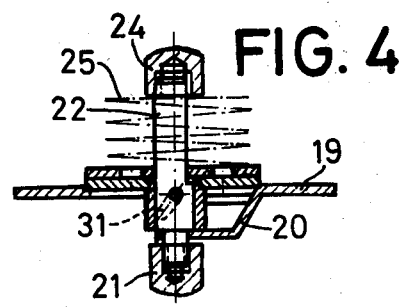
FIG. 4 is a cross-sectional view of another form of a back-pressure valve being closed and taken along line 4—4 of FIG. 6.
Figure 5:
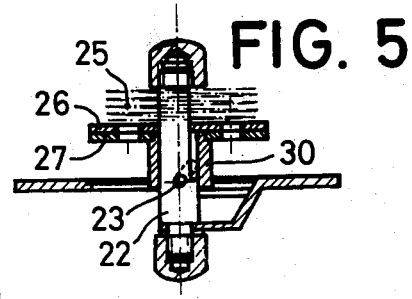
FIG. 5 is a cross-sectional view of the back-pressure valve according to FIG. 4, being open.
Figure 6:
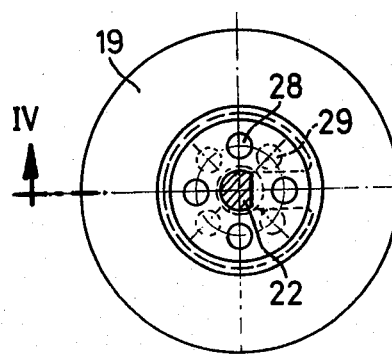
FIG. 6 is a plan view of the back-pressure valve according to FIG. 4.

On the back pressure valve represented in FIGS. 4 to 6 the mask 19 has a crank shaped tongue 20 extending into the through-flow opening on which a central stud 22 is connected by means of a nut 21. Close to its lower end the stud has a small transversal pin 23 and to its upper end is screwed a nut 24 serving as an abutment for the coil spring 25.

Two sealing discs, laying on top of each other are provided each with four holes 28 and 29, the centers of which lay on the same circle. The upper part of the stud being flattened and the upper sealing disc 26 having an appropriate opening in the center, it cannot rotate but only slide. The lower sealing disc 27 is connected permanently to a sleeve 30 enveloping the cylindrical part of the stud. In the sleeve are arranged inclined thread-like slots 31 in which is engaged the pin 23.

In the closed position, as shown in FIGS. 4 and 6, the holes 28 and 29 in the sealing discs are offset, those of one disc being covered by the other one. As soon as the pressure thrusting upward lifts the sealing discs 26 and 27 against the force of the coil spring 25 the lower sealing disc 27 connected to the sleeve 30 is rotated by the slots until in the open position shown in FIG. 6 the holes are aligned and additional through-flow sections are available.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. An improved back-pressure valve assembly, specifically for heating installations, comprising
    an annular mask mounted within a throughflow opening formed in a pump,
    first and second superposed sheet metal sealing disks having at least one eccentric opening each and positioned thereon such that they at least partially overlap when positioned proximate to each other,
    a central stud extending through said throughbore opening and said sealing disks,
    spiral groove guiding means mounted on said stud between said first sealing disk and said stud and cooperating means on said first sealing disk for rotating said first sealing disk when being axially moved,
    said second sealing disk being mounted on said stud for linear shifting movement only, and
    a spring pushing said sealing disks against said mask in closing direction,
    whereby said openings are offset with respect to each other when the valve is closed and said openings overlap forming a passageway when the valve is open.

* * * * *